May 15, 1962 — S. H. WILK — 3,034,796
SHAFT SEAL
Filed Sept. 11, 1959
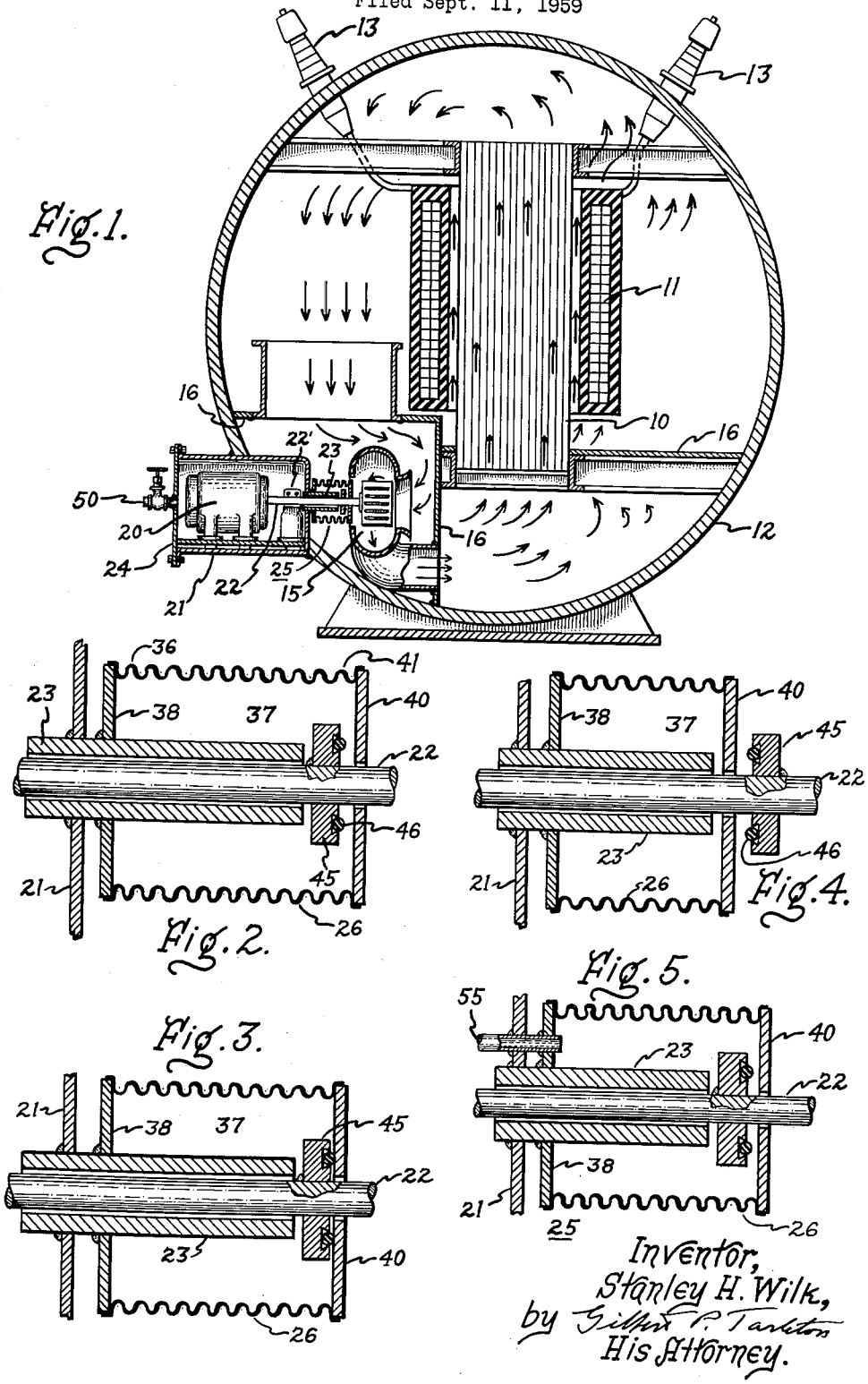
Inventor,
Stanley H. Wilk,
by Gilbert P. Tarleton
His Attorney.

United States Patent Office 3,034,796
Patented May 15, 1962

3,034,796
SHAFT SEAL
Stanley H. Wilk, Pittsfield, Mass., assignor to General
Electric Company, a corporation of New York
Filed Sept. 11, 1959, Ser. No. 839,524
14 Claims. (Cl. 277—12)

This invention relates to a seal for a shaft, and more in particular to a shaft seal for a shaft extending through a wall separating environments of normally equal pressure but which occasionally may have substantially different pressures. While the invention is disclosed in the following paragraphs as particularly adaptable to a blower motor shaft for stationary electrical induction apparatus such as transformers, it will be obvious that other applications may be made of the shaft seal of my invention without departing from the spirit or scope thereof.

In one type of electrical apparatus, an electrical device is disposed within a sealed fluid-filled enclosure. Stationary electrical induction apparatus, such as transformers and the like, are frequently comprised of a magnetic core and electrical windings disposed within a sealed enclosure. In order to remove heat from the apparatus that is generated therein during normal operations, a number of circulation ducts are provided within the apparatus and a circulating fluid, such as a dielectric gas, is provided within the enclosure. Conventional means, such as a fan operated by an electric motor may be provided for circulating the fluid.

When dielectric gases, such as sulphur hexafluoride, are employed within the sealed enclosure, it is preferable that the gas be pressurized in order to obtain certain advantages therefrom such as increased dielectric strength and increased cooling efficiency resulting from higher density of the gas. When the enclosure is pressurized, it is of course necessary to either locate the motor for the circulating fan within the enclosure, or else provide a suitable pressure seal for the rotary shaft and locate the motor outside the enclosure. When the motor is located within the enclosure, maintenance and repair of the motor is extremely difficult, since the pressure within the enclosure must be removed before access can be had to the motor. This necessarily means that the transformer must be removed from service, and may result in the loss of some of the gas. While disposition of the motor outside of the enclosure permits the ready inspection and repair of the motor, this arrangement necessitates the provision of a costly rotary seal which may require more maintenance than the motor itself. Consequently, such arrangements have not been found to be commercially acceptable for use on pressurized gas-filled transformers.

It is therefore an object of this invention to provide an improved sealing arrangement for the shaft of a motor adapted to extend through the wall of a pressurized enclosure.

It is also an object of this invention to provide means facilitating the maintenance and repair of a motor adapted to operate rotary equipment within a pressurized enclosure.

A still further object of this invention is to provide means for operating a fan within a pressurized gas-filled enclosure, the means being characterized by the fact that access to the driving motor is not dependent upon reduction of pressure within the enclosure, and that short lived rotary seals are not required on the motor shaft.

Briefly stated, my invention comprises a seal for a shaft extending through a wall separating environments which occasionally have different fluid pressures. The seal comprises an annular plate loosely surrounding the shaft on one side of the wall and spaced from the wall. Flexible sealing means are provided surrounding the shaft on the same side of the wall as the annular plate means, and the flexible sealing means and plate means define a sealed chamber surrounding the shaft and communicating with the environments on opposite sides of the wall by way of the annular spaces surrounding the shaft as it passes through the wall and plate means. Annular sealing means are provided on the shaft on the same side of the wall as the plate means, the sealing means being normally spaced from the plate means, i.e. when the pressure on opposite sides of the wall is the same. The annular sealing means is positioned to seemingly engage the plate means when forces are exerted on the flexible sealing means due to differences of fluid pressure on opposite sides of the wall.

While the specification concludes with claims particularly pointing out and distinctly claiming the subject matter which I regard as my invention, it is believed that the invention will be better understood from the following description taken in connection with the accompanying drawings.

In the drawings:

FIG. 1 is a cross-sectional view of a transformer disposed within a sealed enclosure, and illustrates the shaft sealing arrangement of one embodiment of my invention for the shaft connecting the motor to the circulating fan disposed within the enclosure, FIG. 2 is an enlarged view of the shaft sealing arrangement of FIG. 1, with the seal being open, FIG. 3 is an enlarged view of the sealing arrangement of FIG. 1, with the seal being closed.

FIG. 4 is an enlarged view of a modified arrangement of seal of FIG. 1,

FIG. 5 is an enlarged view of another modification of the sealing arrangement of FIG. 1.

Referring now to the drawing, and more in particular to FIG. 1, therein is illustrated a transformer comprising a magnetic core 10 disposed in inductive relationship with an electrical winding 11. The electrical device, i.e., the core 10 and winding 11 are disposed within a sealed enclosure 12. Conventional electrical insulating bushings 13 are provided extending through the walls of the enclosure 12 to provide external connections to the winding.

The enclosure 12 is filled with a pressurized dielectric gas, such as sulphur hexafluoride, and in order to withstand the gas pressure. The enclosure 12 may have a circular cross-section.

In order to circulate the gas within the transformer enclosure 12 to effect the cooling of the electrical device, a circulating fan is disposed within the enclosure. The fan may, for example, be a centrifugal fan 15 disposed in the lower portion of the enclosure to force the gas upwardly in heat exchange relationship with the electrical device, and thence downwardly along the sides of the enclosure as illustrated by the arrows in FIG. 1. Suitable barriers 16 are provided within the enclosure to direct the flow of gas in the desired manner.

A motor 20 is disposed within a sealed motor enclosure 21. The shaft 22 of motor 20 extends through a bearing 22' and sleeve 23 in one end of the motor enclosure 21, and is operatively connected to the rotating element of the fan 15 within the enclosure 12. In order to permit access to the motor 20, the motor enclosure 21 may be mounted in an aperture in the wall of the enclosure 12, so that an end of the motor enclosure 21 extending from the enclosure 12 may be provided with a removable plate 24.

With this arrangement, when the removable plate 24 is sealed on the end of the motor enclosure 21, the gas pressure within the motor enclosure will be the same as the gas pressure within the enclosure 12 as a result of leakage of gas through the annular space between the sleeve 23 and the shaft 22.

Under normal operating conditions the equalization of pressure between the motor enclosure 21 and enclosure 12 presents no problem since both enclosures are sealed to prevent escape of the gas to the atmosphere. When it is necessary to remove the plate 24 from the motor enclosure 21 in order to inspect or repair the motor 20, however, the gas pressure within the enclosure 12 may be completely lost as a result of escape of gas through the sleeve 23. In order to prevent such escape of gas, a sealing assembly 25 has been provided surrounding the shaft 22 between the enclosure 21 and the fan.

The seal 25, which may be more clearly seen in FIG. 2, is comprised of a metallic bellows 26 surrounding the shaft 22 as it emerges from the sleeve 23 within the enclosure 12. One end 36 of the bellows 26 is sealed to prevent escape of any gas between the chamber 37 defined by the bellows and the enclosure 12. For example, the end 36 of the bellows may be sealed to an annular plate 38, the plate 38 in turn being sealed, such as by welding, to an extension of the sleeve 23. While the end 36 of the bellows may of course be sealed directly to the wall of the enclosure, the use of the annular plate 38 facilitates the fabrication of the assembly.

An annular plate 40 is provided loosely surrounding the shaft 22 after it has emerged from the sleeve 23 within the enclosure 12, and the other end 41 of the bellows 26 is sealed to the radially outer periphery of the plate 40. The bellows 26 thus supports the plate 40, and the plate 40 is otherwise free to move longitudinally of the shaft 22. The chamber 37 defined by the bellows 26 and annular plates 38 and 40 communicates with the motor enclosure 21 only by way of any annular space existing between the shaft 22 and sleeve 23, and with the enclosure 12 only by way of any annular space existing between the shaft 22 and plate 40.

An annular sealing element or disk 45 is provided rigidly mounted on and surrounding the shaft 22 within the chamber 37. The disk 45 is spaced from the annular plate 40 and the end of the sleeve 23 when no external forces are acting upon the bellows 26, as illustrated in FIG. 2. An annular gasket 46 may be provided in the face of the sealing disk 45 facing the plate 40.

Referring again to FIG. 1, as previously stated when the plate 24 is sealed on the end of the motor enclosure 21, the pressure within the enclosure 21 will be the same as that within the enclosure 12 as a result of imperfect sealing provided by the sleeve 23. In this case, the pressure within the chamber 37 will also be the same as that within the enclosure 12, and the plate 40 will be held spaced apart from a sealing disk 45 by means of the bellows 26. The shaft 22 may thus rotate, without any engagement between the gasket on the sealing disk and the plate 40.

When pressure within the enclosure 21 is reduced, for example, by removing the plate 24, gas may escape from the chamber 37 to the motor enclosure 21 by way of the sleeve 23. This results in a reduction of pressure within the chamber 37 and as a result the bellows 26 contracts axially until the plate 40 engages the gasket 46 on the sealing disk 45 as illustrated in FIG. 3. When the plate 40 engages the sealing disk gasket in this manner, gas cannot escape from the enclosure 12 to the motor enclosure 21. Consequently, inspection or repair of the motor 20 may proceed without danger of loss of pressure within the enclosure 12.

When it is desired to return the motor 20 to service, the end plate 24 is again sealed in place over the end of the enclosure 21 and, in order to open the seal 25, a gas pressure substantially equal to the pressure within the enclosure 12 is provided within the enclosure 21, for example, by way of a valve 50 disposed in the plate 24. The pressure thus provided within the enclosure 21 results in the axial extension of the chamber 37 as a result of gas passing from the enclosure 21 through the sleeve 23, and the resultant movement of the plate 40 from sealing relationship with the sealing disk gasket.

In the arrangement of my invention illustrated in FIG. 4, the sealing disk 45 is rigidly mounted on shaft 22 externally of the chamber 37, but interiorly of the enclosure 21, and spaced from plate 40. The annular gasket 46 in the face of the sealing disk 45 faces the side of the plate 40 externally of the chamber 37. In this modification, the closing of the seal is effected by reduction of pressure in the space surrounding the bellows 26 causing the bellows to expand. Thus, when the plate 24 is removed, the pressure surrounding the chamber 37 drops to atmospheric pressure. The pressure within the chamber 37 remains above atmospheric pressure, however, because the chamber 37 communicates with the interior of the tank 12 through the sleeve 23. Thus, the relatively high pressure on the interior of the bellows 26 causes it to expand and move into sealing contact with the disk 45.

Referring again to FIG. 2, the contraction of the bellows to close the seal is affected by the escape of gas through the annular space between the sleeve 23 and shaft 22. If sufficient gas cannot escape in this manner, the gas entering the chamber 37 by way of the annular space between the shaft 22 and plate 40 may serve to maintain the pressure within the chamber 37 at substantially the same value as within the enclosure 12. In this event, the seal will not close, with the result that the gas pressure within the enclosure 12 may be lost. For this reason, it may be desirable to provide an auxiliary opening or tube 55 (FIG. 5) extending between the chamber 37, through the plate 38, and into the chamber 21. The tube 55 may have a sufficiently large internal diameter to insure a reduction of pressure within the chamber 37 upon the occurrence of a reduction of pressure within the enclosure 21.

Thus, according to this invention a motor may be provided for operating a fan within a sealed pressurized enclosure without necessitating the mounting of the motor in an inaccessible position, and without necessitating the use of expensive short lived pressure seals since the seal in my invention is normally open during rotation of the motor shaft, in normal use. My invention provides the further advantage that a minimum of the pressurized gas may be lost as a result of inspection or repair of the motor, and the continued operation of devices within the enclosures is not impaired by inspection or repair of the motor, since access may be had to the motor without loss of pressure within the enclosure.

It will be understood, of course, that while the forms of the invention herein shown and described constitute preferred embodiments of my invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What I claim as new and desire to secure by Letters Patent of the United States is:

1. In combination: a wall separating environments which normally have equal fluid pressures but occasionally have different fluid pressures, a shaft passing through said wall, and a seal for said shaft comprising annular plate means loosely surrounding said shaft on one side of said wall and spaced from said wall, flexible sealing means surrounding said shaft on said one side of said wall, said flexible sealing means and plate means defining a sealed chamber surrounding said shaft means and communicating with said environment by way of annular spaces surrounding said shaft as it passes through said wall and plate means, and annular sealing means on said shaft on said one side of said wall and normally spaced from said plate means, said annular sealing means being positioned to sealingly engage said plate means only when forces exerted on said flexible sealing means due to differences in the fluid pressure on opposite sides of said wall cause said flexible sealing means to move said plate means along said shaft into contact with said sealing means.

2. In combination: a wall separating environments which normally have equal fluid pressures but occasionally have different fluid pressures, a shaft loosely extending through said wall, and a seal for said shaft comprising annular plate means loosely surrounding said shaft on one side of said wall and spaced from said wall, flexible sealing means surrounding said shaft on said one side of said wall, said sealing means and plate means defining a chamber whose only exists are the spaces surrounding said shaft as it passes through said wall and said plate means, and annular sealing disk means on said shaft on said one side of said wall, said plate means being spaced from said disk means when the fluid pressures on opposite sides of said wall are the same and sealingly contacting said disk means only when forces exerted on said flexible sealing means due to differences in the fluid pressures on opposite sides of said wall cause said flexible sealing means to move said plate means along said shaft into contact with said sealing means.

3. In combination: a wall separating environments which normally have equal fluid pressures but occasionally have different fluid pressures, a shaft extending through said wall, and seal for said shaft comprising annular plate means loosely surrounding said shaft on one side of said wall and spaced from said wall, bellows means surrounding said shaft on said one side of said wall, said bellows means being sealed to and supporting said plate means for movement longitudinally of said shaft, said bellows means and plate means defining a sealed chamber surrounding said shaft means and communicating with said environments by way of the annular spaces surrounding said shaft as it passes through said wall and plate means, and annular sealing means on said shaft on said one side of said wall and normally spaced from said plate means, said annular sealing means being positioned to sealingly engage said plate means only when forces exerted on said bellows means due to differences in the fluid pressure on opposite sides of said wall cause said bellows means to move said annular plate means longitudinally along said shaft into contact with said sealing means.

4. The seal of claim 3 in which said annular sealing means is disposed within said sealed chamber.

5. The seal of claim 3 in which said annular sealing means is disposed externally of said sealed chamber.

6. In combination: a wall separating environments which normally have equal fluid pressures but occasionally have different fluid pressures, a shaft loosely extending through said wall, and a seal for said shaft comprising bellows means surrounding said shaft on one side of said wall and having one end sealed to said wall, annular plate means loosely surrounding said shaft on said one side of said wall and sealed to the other end of said bellows, and annular sealing disk means on said shaft on said one side of said wall, said disk means being positioned to sealingly engage said plate means only when pressures exerted on said bellows means due to the difference in fluid pressure on opposite sides of said wall cause said bellows means to move said annular plate means longitudinally along said shaft into contact with said sealing means.

7. In combination: a wall separating environments of normally equal fluid pressure and occasionally unequal fluid pressure, a rotatable shaft loosely extending through said wall, and a seal for said shaft on one side of said wall and having one end sealed to said wall, annular plate means loosely surrounding said shaft on said side of said wall and sealed to the other end of said bellows, said bellows means supporting said annular plate means for movement longitudinally of said shaft, and annular sealing disk means on said shaft on said one side of said wall, said disk means being positioned to sealingly engage said plate means only when forces exerted on said bellows means due to a difference in fluid pressure on opposite sides of said wall cause said bellows means to move said annular plate means longitudinally along said shaft into contact with said sealing means.

8. The seal of claim 7 in which said annular sealing disk means is positioned on said shaft between said wall and said annular plate means.

9. The seal of claim 7 in which said annular plate means is positioned between said wall and said annular disk means.

10. In an electrical induction apparatus sealed in a fluid containing receptacle, in which means inside the receptacle for circulating said fluid is connected to power means outside of said receptacle by a shaft, the improvement in a seal for said shaft comprising an enclosure surrounding said power means, a portion of said enclosure defining a wall between said power means and the fluid circulating means, said shaft passing through an opening in said wall, a bellows having a fixed end and a movable end surrounding a portion of said shaft, said shaft passing through an opening in the movable end of said bellows, the last mentioned opening being of such a size as to permit relative movement between said movable end and said shaft, a sealing element affixed to said shaft adjacent but spaced from said movable end, the interior of said bellows being in communication with both said enclosure and said receptacle by means of the previously mentioned openings, so that said receptacle, enclosure, and bellows are ordinarily maintained at the same pressure, a drop in pressure in said enclosure causing the movable end of said bellows to travel along said shaft into sealing contact with said sealing element, whereby said receptacle is maintained at substantially constant pressure.

11. The improvement recited in claim 10 in which said sealing element has an annular gasket protruding from the side thereof that faces said movable end.

12. The improvement defined in claim 10 in which said bellows is mounted on the side of said wall on the interior of said receptacle, the interior of said bellows and enclosure communicating with each other through the opening in said wall, and the sealing element being affixed to said shaft on the inside of said bellows, whereby a pressure drop in said receptacle will cause said bellows to contract and draw said movable end into contact with the sealing element.

13. The improvement recited in claim 12 in which an auxiliary opening that communicates with the interior of said bellows is provided in said wall.

14. The improvement defined in claim 10 in which said bellows is mounted on the interior of said enclosure, the interior of said bellows and said receptacle communicating with each other through the opening in said wall, and the sealing element being affixed to said shaft on the outside of said bellows, whereby a pressure drop in said receptacle will cause said bellows to expand and push said movable end into contact with the sealing element.

References Cited in the file of this patent

UNITED STATES PATENTS

| | | |
|---|---|---|
| 2,252,642 | Popper | Aug. 12, 1941 |
| 2,747,901 | Clavell | May 29, 1956 |

OTHER REFERENCES

Electrical World (pages 54 and 55) Mar. 2, 1959.

UNITED STATES PATENT OFFICE
CERTIFICATE OF CORRECTION

Patent No. 3,034,796                                         May 15, 1962

Stanley H. Wilk

It is hereby certified that error appears in the above numbered patent requiring correction and that the said Letters Patent should read as corrected below.

Column 5, line 11, for "exists" read -- exits --; line 66, after "shaft" insert -- comprising bellows means surrounding said shaft --.

Signed and sealed this 13th day of November 1962.

SEAL)
Attest:

ERNEST W. SWIDER                                  DAVID L. LADD
Attesting Officer                                    Commissioner of Patents